(12) United States Patent
Matake (10) Patent No.: US 10,512,995 B2
(45) Date of Patent: Dec. 24, 2019

(54) WORK CLAMPING DEVICE

(71) Applicant: FANUC CORPORATION, Yamanashi (JP)

(72) Inventor: Kazuyoshi Matake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 196 days.

(21) Appl. No.: 15/719,675

(22) Filed: Sep. 29, 2017

(65) Prior Publication Data

US 2018/0093358 A1    Apr. 5, 2018

(30) Foreign Application Priority Data

Oct. 5, 2016  (JP) .................................. 2016-196911

(51) Int. Cl.
*B23Q 3/154*   (2006.01)
*B25B 5/14*    (2006.01)
(Continued)

(52) U.S. Cl.
CPC ........... *B23Q 3/1543* (2013.01); *B23Q 3/064* (2013.01); *B25B 1/20* (2013.01); *B25B 5/14* (2013.01); *B25B 11/002* (2013.01)

(58) Field of Classification Search
CPC .......... B23Q 3/002; B23Q 3/005; B23Q 3/02; B23Q 3/06; B23Q 3/062; B23Q 3/064;
(Continued)

(56) References Cited

U.S. PATENT DOCUMENTS 217,364  A  *  7/1879  Goss ....................... B25B 1/103
                                                       269/251
550,767  A  *  12/1895  Thielscher .............. B23B 47/28
                                                       408/97
(Continued)

FOREIGN PATENT DOCUMENTS

CN    205552078 U    9/2016
JP    S54-38023 A    3/1979
(Continued)

OTHER PUBLICATIONS

Japanese Office Action dated Aug. 21, 2018, in connection with corresponding JP Application No. 2016-196911 (6 pgs., including English translation).

(Continued)

*Primary Examiner* — Tyrone V Hall, Jr.
(74) *Attorney, Agent, or Firm* — Maier & Maier, PLLC (57) ABSTRACT

This work clamping device including a receiving member which has a first contacting surface which comes into contact with a first circumference position of an outer circumference surface of a columnar portion of a work and a second contacting surface which comes into contact with a second circumference position of the outer circumference surface of the columnar portion, an attraction member which is provided in the receiving member and which is made of a ferromagnetic material or a magnet, a pre-clamping positioning member which is attached to the columnar portion and which temporarily hold the columnar portion to the receiving member by being attracted to the attraction member by magnetic force, and a clamp mechanism which presses the columnar portion temporarily positioned by the pre-clamping positioning member toward the receiving member.

3 Claims, 12 Drawing Sheets

(51) Int. Cl.
*B25B 11/00* (2006.01)
*B23Q 3/06* (2006.01)
*B25B 1/20* (2006.01)

(58) Field of Classification Search
CPC ........ B23Q 3/15; B23Q 3/154; B23Q 3/1546; B23Q 3/18; B23Q 3/186; B25B 1/20; B25B 11/00; B25B 11/002; B25B 11/02; B25B 5/00; B25B 5/02; B25B 5/14; B25B 5/147
See application file for complete search history.

(56) References Cited

U.S. PATENT DOCUMENTS

| | | | | |
|---|---|---|---|---|
| 810,319 | A * | 1/1906 | Blazej | B23B 47/28 269/126 |
| 1,329,728 | A * | 2/1920 | Sovereign | B25B 1/103 269/100 |
| 1,535,570 | A * | 4/1925 | Bryant | B23Q 3/104 269/223 |
| 1,923,967 | A * | 8/1933 | Brown, Jr. | B23Q 3/066 269/234 |
| 2,364,150 | A * | 12/1944 | Lowenstein | B23Q 3/104 269/146 |
| 2,422,773 | A * | 6/1947 | Colwill | B25B 1/20 269/107 |
| 2,455,024 | A * | 11/1948 | Schneider | B23B 47/281 269/902 |
| 2,475,456 | A * | 7/1949 | Norlander | B23Q 3/154 335/286 |
| 3,743,566 | A * | 7/1973 | Louthan | B29C 66/52241 156/296 |
| 4,340,211 | A * | 7/1982 | Chiappetti | B25B 5/147 269/110 |
| 4,445,678 | A * | 5/1984 | George | B23Q 3/104 269/282 |
| 6,182,954 | B1 * | 2/2001 | Zhang | B25B 1/18 269/7 |
| 6,254,077 | B1 * | 7/2001 | Riley, Jr. | B25B 5/10 269/156 |
| 6,435,497 | B1 * | 8/2002 | Borter | B23Q 3/104 269/296 |
| 6,514,123 | B1 | 2/2003 | Crevasse et al. | |
| 7,144,306 | B1 * | 12/2006 | Yen | B24B 9/146 451/57 |
| 7,252,578 | B2 * | 8/2007 | Yen | B24B 9/14 451/178 |
| 2001/0045695 | A1 * | 11/2001 | Andronica | B25B 1/2452 269/268 |

FOREIGN PATENT DOCUMENTS

| | | |
|---|---|---|
| JP | S55-17778 U | 2/1980 |
| JP | S55-28959 U | 2/1980 |
| JP | S55-98537 U | 7/1980 |
| JP | S56-120108 A | 9/1981 |
| JP | S59-187470 A | 10/1984 |
| JP | 60020831 A * | 2/1985 |
| JP | S60-20831 A | 2/1985 |
| JP | S61-102448 U1 | 6/1986 |
| JP | S63-060550 U | 4/1988 |
| JP | H02-61538 U | 5/1990 |
| JP | H05-318254 A | 12/1993 |
| JP | 2000-107968 A | 4/2000 |
| JP | 3086121 B2 | 9/2000 |
| JP | 2003-48130 A | 2/2003 |
| JP | 2009-34780 A | 2/2009 |
| JP | 2009-166183 A | 7/2009 |

OTHER PUBLICATIONS

Japanese Search Report dated Jun. 29, 2018, in connection with corresponding JP Application No. 2016-196911 (13 pgs., including English translation).

Decision to Grant a Patent dated Dec. 11, 2018 in corresponding Japanese Application No. 2016-196911; 6 pages including English-language translation.

* cited by examiner

WORK CLAMPING DEVICE

CROSS-REFERENCE TO RELATED APPLICATIONS

This application is based on and claims priority to Japanese Patent Application No. 2016-196911 filed on Oct. 5, 2016, the entire content of which is incorporated herein by reference.

TECHNICAL FIELD

The present invention relates to a work clamping device for clamping a work.

BACKGROUND ART

As this kind of work clamping device, a device which is provided with a plurality of reference pins extending in an up-and-down direction on an upper surface of a plate-like receiving member which is made of a ferromagnetic material and which presses and clamps a work toward the plate-like receiving member after positioning the work with regard to the plate-like receiving member in the horizontal direction by inserting the reference pins into positioning holes provided on a bottom surface of the work is known. (See PTL 1, for example.)

This work clamping device conducts clamping by a clamp mechanism after attracting a plurality of spacer seats made of a magnet to a voluntary position on the plate-like receiving member before inserting the reference pins into the positioning holes, positioning the work by the reference pins in a horizontal direction, and adjusting distance between the upper surface of the plate-like member and the lower surface of the work by the spacer seat.

CITATION LIST

Patent Literature

{PTL 1} Japanese Unexamined Utility Model Application, Publication No. S61-102448

SUMMARY OF INVENTION

A work clamping device according to a first embodiment including a receiving member which has a first contacting surface which comes into contact with a first circumference position of an outer circumference surface of a columnar portion of a work, and a second contacting surface which comes into contact with a second circumference position of the outer circumference surface of the columnar portion; an attraction member which is provided in the receiving member and which is made of a ferromagnetic material or a magnet; a pre-clamping positioning member which is to be attached to the columnar portion and which temporarily hold the columnar portion to the receiving member by being attracted to the attraction member by magnetic force; and a clamp mechanism which presses the columnar portion temporarily positioned by the pre-clamping positioning member toward the first and the second contacting surfaces of the receiving member.

DESCRIPTION OF EMBODIMENTS

A work clamping device in accordance with a first embodiment of the present invention is described below with reference to the drawings.

Figure 1:
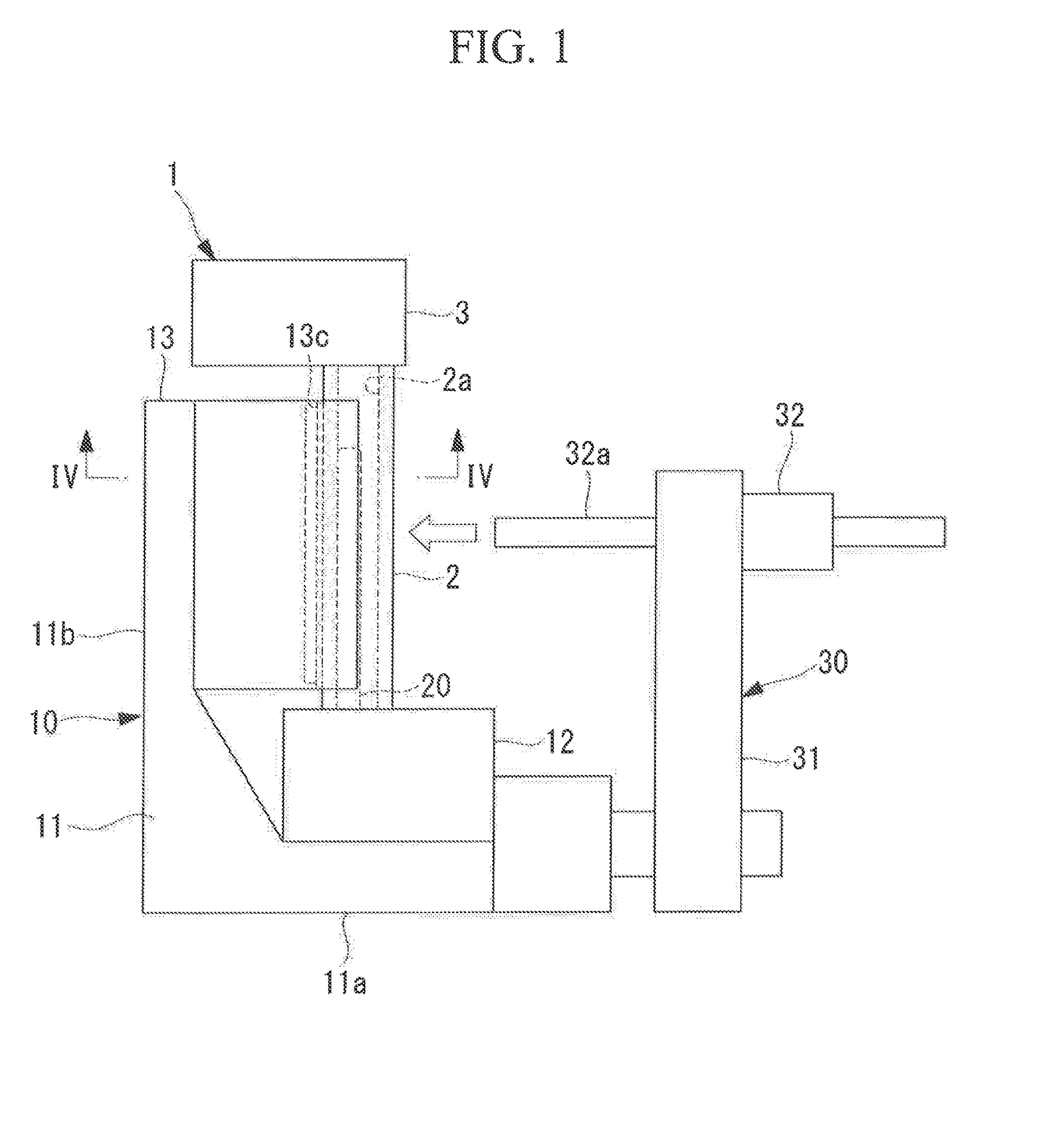
FIG. 1 is a schematic front view showing a work clamping device and a work according to a first embodiment of the present invention.
Figure 2:
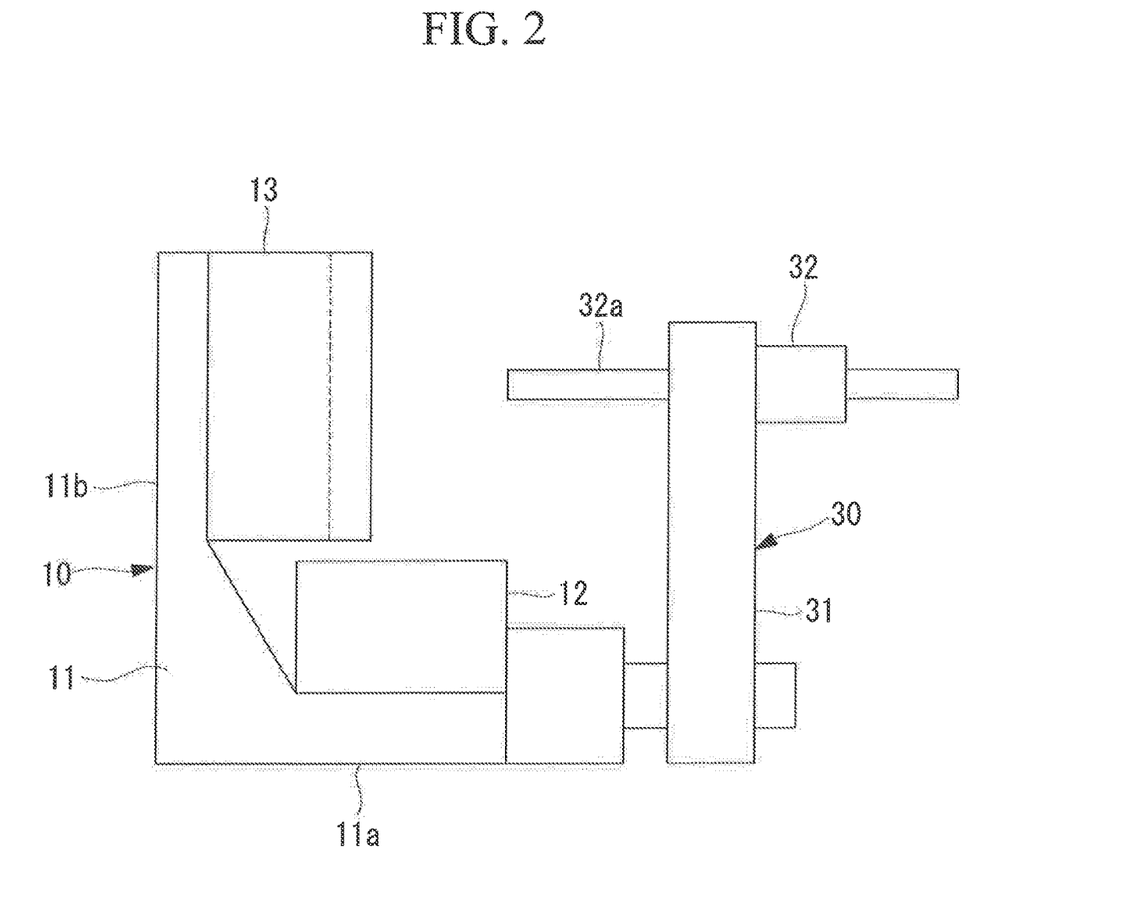
FIG. 2 is a schematic front view showing the work clamping mechanism according to the first embodiment.

As shown in FIG. 1, this work clamping device comprises a receiving member 10, a pre-clamping positioning member 20, and a clamp mechanism 30 which is fixed so that the clamp mechanism does not move with regard to the receiving member 10. This work clamping device is for clamping a work 1 shown in FIGS. 1, 3, and the like.

Figure 3:
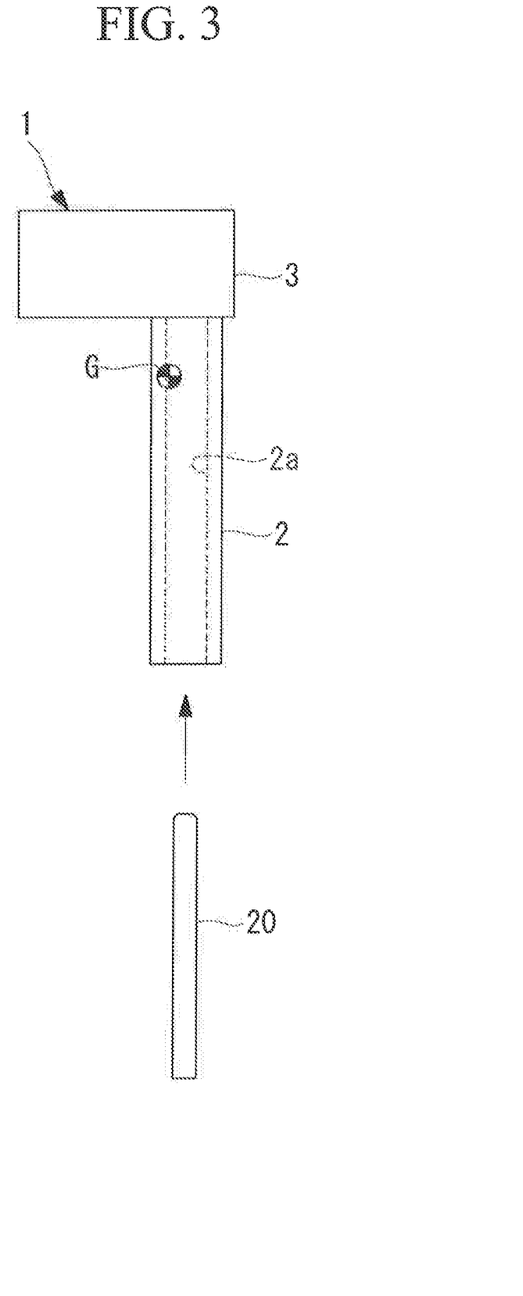
FIG. 3 is a schematic front view showing the work and a pre-clamping positioning member of the first embodiment.

The work 1 has a columnar portion 2 which has a circular shape in its cross section, and a head portion 3 which is provided at one end of the columnar portion 2 in the axial direction. A hollow portion 2a which has a circular shape in its cross section and which extends in the axial direction of the columnar portion 2 is provided inside the columnar portion 2. As shown in FIG. 3, the center of gravity G of the work 1 is located at a position closer to the head portion 3 because of the presence of the head 3. Predetermined processing is performed on the work 1 which is clamped to the work clamping device. In this embodiment, the head portion 3 of the work 1 is cut by a processing device, such as a milling device and the like, so that the work 1 is cut to a predetermined height position.

The receiving member 10 has a L-shaped base member which includes a horizontal portion 11a which extends in the substantially horizontal direction, and a vertical portion 11b which extends in the vertical direction from one end side of the horizontal portion 11a, and which is fixed to a predetermined installation place, a seat portion 12 which is fixed above the horizontal portion 11a, and a V-shaped receiver 13 which is fixed to the vertical portion 11b. The seat portion 12 is preferably a cubic block which is made of a non-ferromagnetic metal, and in this embodiment, the upper surface of the seat portion 12 is a plane surface.

The V-shaped receiver 13 is a metallic block, and a V-shaped groove which extends in the up-and-down direction is formed on a surface which is opposite to a surface fixed to the vertical portion 11b. The work 1 is positioned with regard to the receiving member 10 so that the outer circumference surface of the columnar portion 2 comes in contact with the V-shaped groove of the V-shaped receiver 13, and that the lower surface of the columnar portion 2 comes in contact with the seat portion 12.

Figure 4:
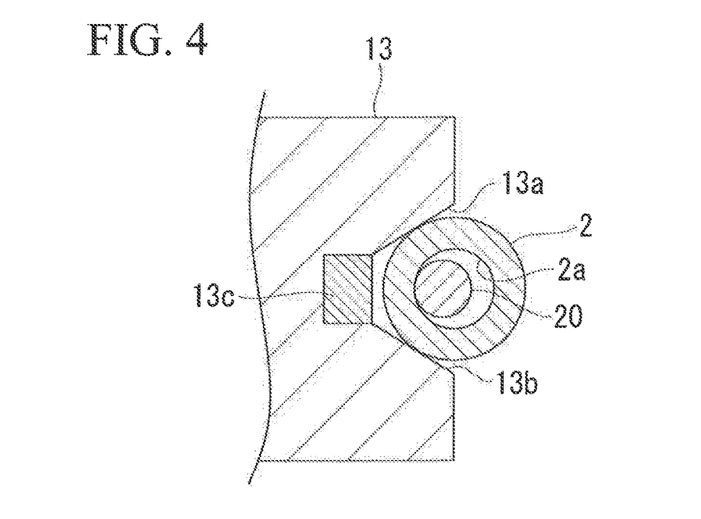
FIG. 4 is a sectional view taken along line IV-IV of FIG. 1.

At this stage, the head 3 of the work 1 is placed above the upper end surface of the V-shaped receiver 13. Also, one surface 13a which constitutes the V-shaped groove comes in contact with a first circumference position of the outer circumference surface of the columnar portion 2, and the other surface 13b which constitutes the V-shaped groove comes in contact with a second circumference position of the outer circumference surface of the columnar portion 2 (FIG. 4). Further, an attraction portion (magnet) 13c, which is a permanent magnet, is fixed to a bottom surface of the V-shaped groove of the V-shaped receiver 13.

The clamp mechanism 30 has a clamp mechanism main body 31 which is fixed to the receiving member 10, and an air cylinder 32 which is fixed to the clamp mechanism main body 31. The air cylinder 32 has a rod 32a as a pressing member which presses the columnar portion 2 to the receiving member 10, and the air cylinder is for moving the rod 32a as shown by an arrow in FIG. 1 so that a tip surface of the rod 32a comes in contact with the outer circumference surface of the columnar portion 2 of the work which is positioned with regard to the receiving member 10.

As shown in FIGS. 1, 3, and 4, this work clamping device includes a pre-clamping positioning member 20 which is placed in the hollow portion 2a of the columnar portion 2 of the work 1. The pre-clamping positioning member 20 is made of a ferromagnetic material which is magnet-attractable, such as an iron and the like, and the pre-clamping positioning member 20 has, for example, a circular shape in its cross section. The pre-clamping positioning member 20 is formed so that the pre-clamping positioning member 20 can be inserted into the hollow portion 2a of the columnar portion 2, as shown in FIG. 3.

An exemplary method for clamping the work 1 by the work clamping device is described below.

First, as shown in FIG. 3, the pre-clamping positioning member 20 is inserted into the hollow portion 2a of the columnar portion of the work 1. Then, as described above, the work is positioned with regard to the receiving member 10 so that the outer circumference surface of the columnar portion 2 comes in contact with the V-shaped groove of the V-shaped receiver 13 and that the lower end surface of the columnar portion 2 comes in contact with the seat portion 12, which leads to the state shown in FIG. 1.

At this stage, the pre-clamping positioning member 20 which is located in the columnar portion 2 of the work 1 is attracted by the attraction portion 13c which is provided in the V-shaped receiver 13. Due to this attraction force, force heading to the bottom portion of the V-shaped groove is applied to the pre-clamping positioning member 20, and this force keeps a state where the outer circumference surface of the columnar portion 2 of the work 1 has contact with the one surface and the other surface 13a, 13b of the V-shaped receiver 13.

With this state, by moving the rod 32a of the air cylinder 32 as shown by an arrow in FIG. 1, the tip surface of the rod 32a of the air cylinder 32 abuts against the outer circumference surface of the columnar portion 2. Contact of the tip surface of the rod 32a of the air cylinder 32 with the outer circumference surface of the columnar portion 2 causes a situation where the columnar portion 2 is pressed to the one surface 13a and the other surface 13b of the V-shaped groove of the V-shaped receiver 13, which clamps the work 1.

In this embodiment, before clamping the work 1 by the work clamping mechanism 30, force toward the bottom surface of the V-shaped groove is applied to the pre-clamping positioning member 20 which is placed inside the columnar portion 2 of the work 1 so as to keep a state where the outer circumference surface of the columnar portion 2 of the work 1 has contact with the V-shaped groove of the V-shaped receiver 13 by this force. Therefore, when the center of gravity G of the work 1 is located at a side of the head portion 3 as described in this embodiment, and even in a case where it is necessary to clamp the work so that the head portion 3 is located at the upper side thereof as shown in FIG. 1, the clamp mechanism 30 is capable of clamping the work 1 while keeping a state where the outer circumference surface of the columnar portion 2 has contact with the both surfaces 13a, 13b of the V-shaped grove, and where the lower end side of the columnar portion 2 has contact with the upper surface of the seat portion 12.

Figure 9:
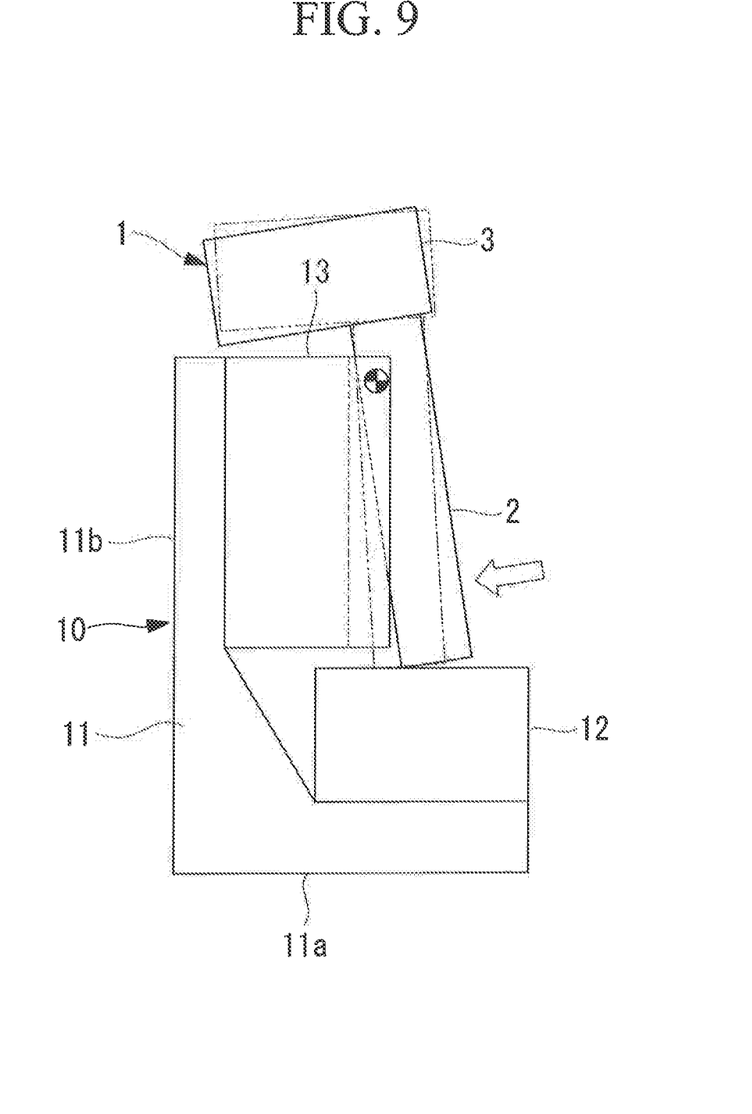
FIG. 9 is a view showing a movement of the work on the work clamping device of FIG. 5.
Figure 10:
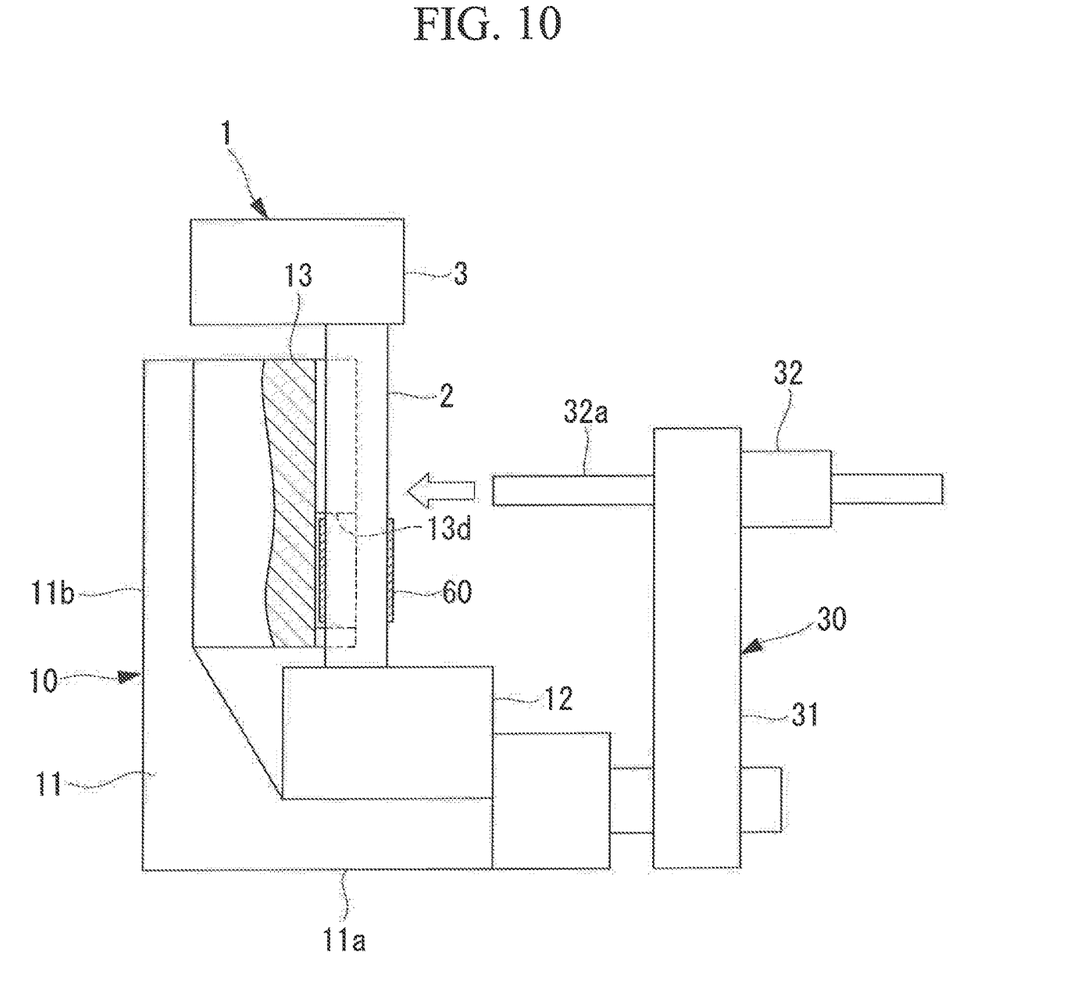
FIG. 10 is a schematic front view showing a first modified example of the work clamping device of the first embodiment.

As a different structure, a case where the work 1 is clamped by the clamp mechanism 30 without using the pre-clamping positioning member 20 will be explained below. Since the center of gravity G of the work 1 is located at the side of the head portion 3, as shown in FIG. 9, the work 1 will more likely to tilt around the center of gravity G by weight of the head portion 3 when the work 1 is positioned with regard to the receiving member 10 so that the head portion 3 is located at the upper side. In other words, as shown in FIG. 9, such a case occurs that the clamp mechanism 30 conducts clamping in a state where the outer circumference surface of the columnar portion 2 does not have contact with the both surfaces 13a, 13b of the V-shaped groove.

Figure 5:
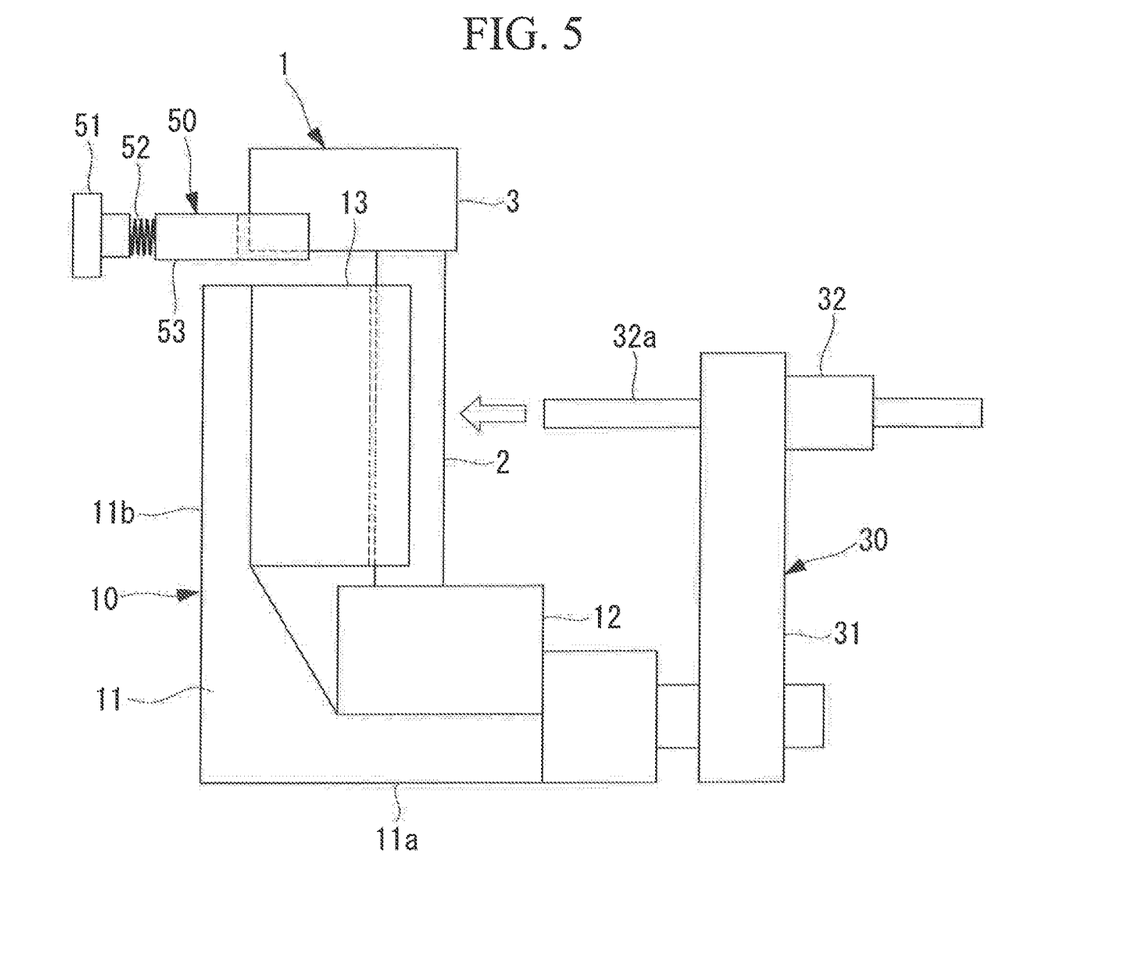
FIG. 5 is a schematic front view showing a work clamping device which temporarily positions the work by another method.

In order to prevent such defect, as shown in FIG. 5, an auxiliary support mechanism 50 may be provided so as to prevent the head portion 3 from moving unintentionally. For example, the auxiliary support mechanism 50 has a cylinder 51, a spring 52 which is supported by a distal end portion of a rod of the cylinder 51, and a V-shaped block 53 which is supported by a distal end portion of the spring 52, and the auxiliary support mechanism 50 is configured to support the work 1 by the V-shaped block 53 from the tilting direction of the work 1. With this structure, it may be possible to prevent the work 1 from tilting by adequately adjusting a projecting amount of the rod of the cylinder 51.

Figure 6:
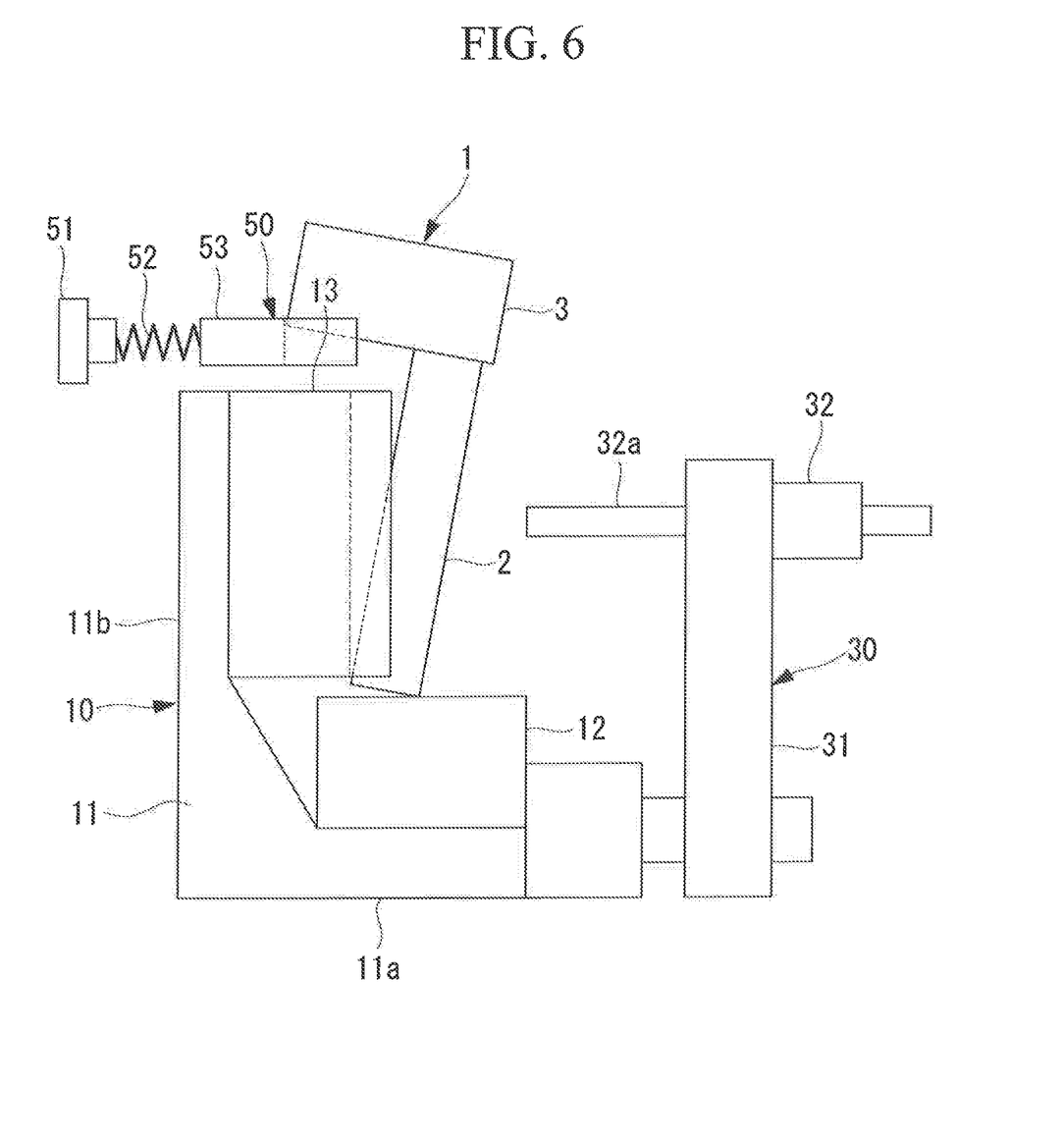
FIG. 6 is a view showing a movement of the work on the work clamping device of FIG. 5.

However, it is not easy to adjust the cylinder 51 so that the columnar portion 2 of the work 1 has contact with the V-shaped receiver 13 while preventing the work 1 from tilting, also, the work 1 has variations in sizes, weights, and places of the center of gravity of the work 1. When an adjustment on the cylinder 51 is not adequate, and when support force of the auxiliary support mechanism 50 is larger than a necessary value, the columnar portion 2 will be tilted and the upper side of the columnar portion 2 will be detached from the V-shaped receiver 13, and at the same time, a gap will be formed between the lower end surface of the columnar part 2 and the seat portion 12 in accordance with the tilted amount of the columnar portion 2, as shown in FIG. 6.

Figure 7:
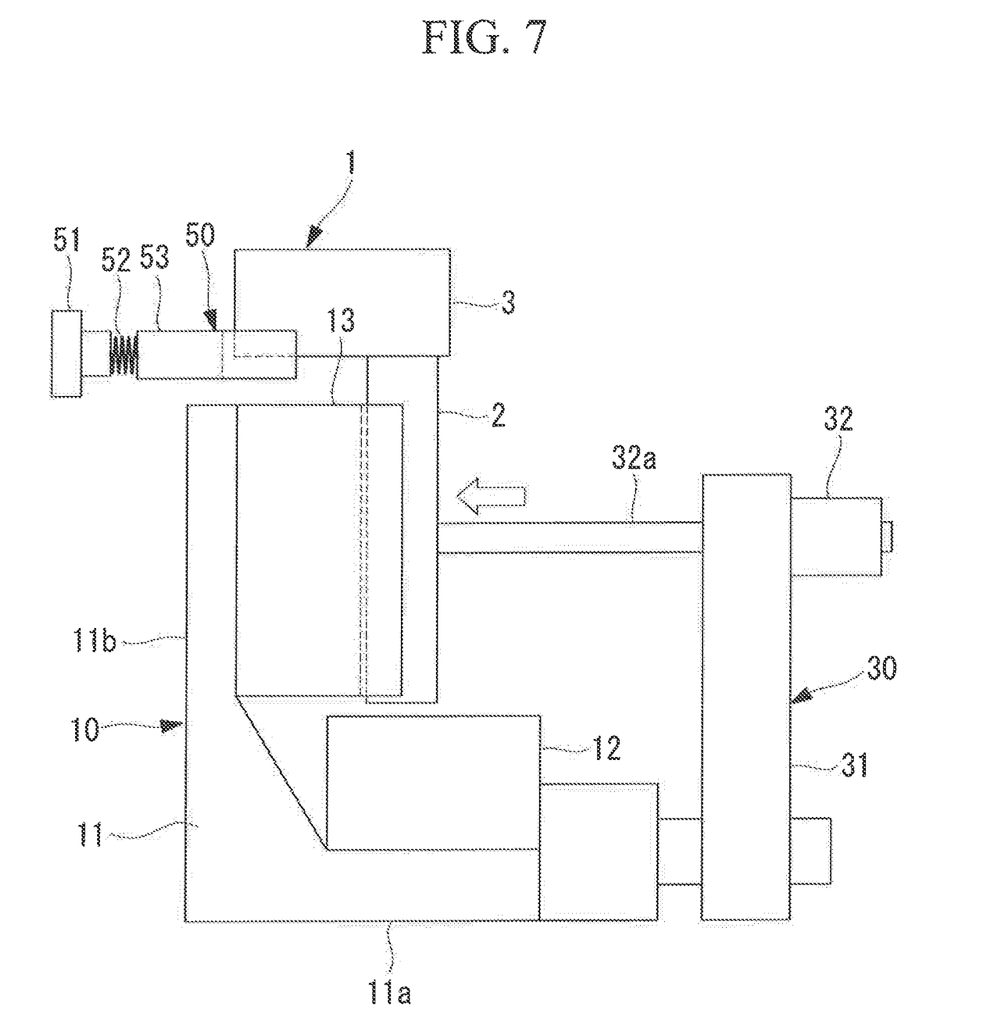
FIG. 7 is a view showing a movement of the work on the work clamping device of FIG. 5.
Figure 8:
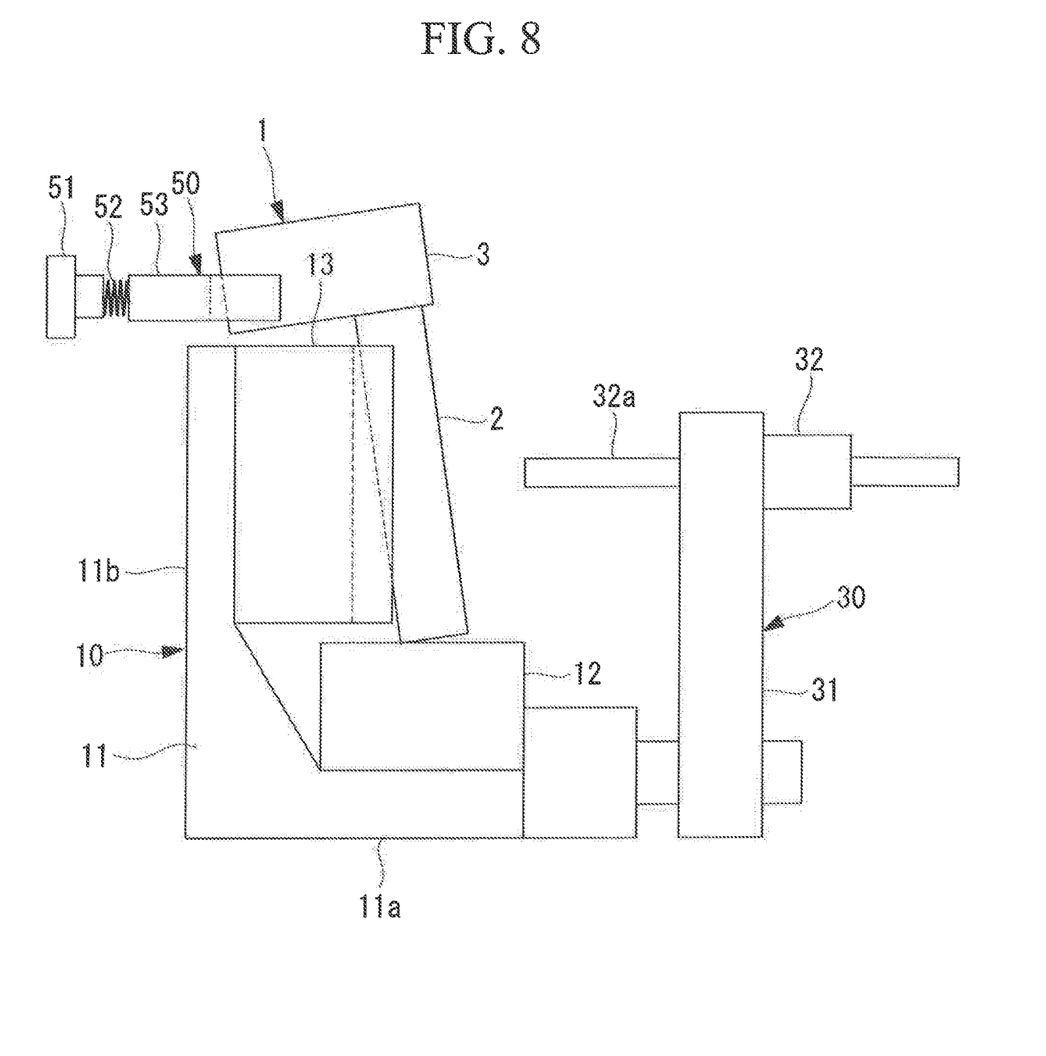
FIG. 8 is a view showing a movement of the work on the work clamping device of FIG. 5.

With this state, when the columnar portion 2 is pressed to the V-shaped receiver 13 by the clamp mechanism 30, the work 1 will be clamped in a state where the gap is formed between the lower end surface of the columnar portion 2 and the seat portion 12 as shown in FIG. 7. Also, this may be a cause for degrading accuracy of the processing of the work 1. For example, when cutting the work 1 with reference to the upper surface of the seat portion 12, the processing amount will be increased by the size of the gap.

Although, it may be possible to prevent such gap using the weight of the work 1 when operation speed of the rod 32a of the air cylinder 32 of the clamp mechanism 30 is reduced, it is not practical because such a measure will decrease productivity.

On the other hand, when the support force of the auxiliary support mechanism 50 is small, a gap will also be formed between the lower end surface of the columnar portion 2 and the seat portion 12 in accordance with the tilted amount of the columnar portion 2, as shown in FIG. 7.

On the contrary, with this embodiment, before clamping the work 1 by the clamp mechanism 30, a state where the outer circumference surface of the columnar portion 2 of the work 1 has contact with the V-shaped groove of the V-shaped receiver 13 is maintained by the attraction force which works on the pre-clamping positioning member 20. As described above, it is possible to hold the work 1 temporarily with regard to the receiving member 10 so as to prevent position of the work 1 from moving without detailed settings.

As described above, according to this embodiment, the pre-clamping positioning member 20 is attached to the columnar portion 2 of the work 1, and work 1 is temporarily held to the receiving member 10 by the pre-clamping positioning member 20 attracted to the attraction member 13c which is provided in the receiving member 10. Therefore, the work 1 can be stably clamped regardless of its posture even when the work 1 is not made of magnet-attractable materials.

Specifically, as shown in FIG. 3, when the center of gravity G of the work 1 is located at the side of the head portion 3, and when it is necessary to clamp the work 1 so that the head portion 3 is located at its upper side, it is possible to clamp the work 1 by the clamp mechanism 30 while keeping the state where the outer circumference surface of the columnar portion 2 has contact with the both surfaces 13a, 13b of the V-shaped groove, and where the lower end part of the columnar portion 2 has contact with the upper surface of the seat portion 12.

Also, with this embodiment, the columnar portion 2 has the hollow portion 2a and the pre-clamping positioning member 20 is attached to the columnar portion 2 by inserting the pre-clamping positioning member 20 into the hollow portion 2a. Thus, since the pre-clamping positioning member 20 is not exposed outside the work 1 when temporarily positioning the work 1 and when pressing the work 1 to the receiving member 10 by the clamp mechanism 30, flexibility in deciding press positions of the clamp mechanism 30 and processing positions of the work 1 will be large.

Moreover, the attraction portion 13c can be an electromagnet. In such case, attraction force which attracts the pre-clamping positioning member 20 can be adjusted in accordance with strength of the work 1, distance between the pre-clamping positioning member 20 which is attached to the work 1 and the attraction member 13c, and the like. With this configuration, it is possible to prevent the work 1 from being deformed or damaged when the strength of the work 1 is low, and when it is necessary to slightly adjust a position of the work 1 on the receiving member 10, it is possible to perform such adjusting work easily.

Figure 11:
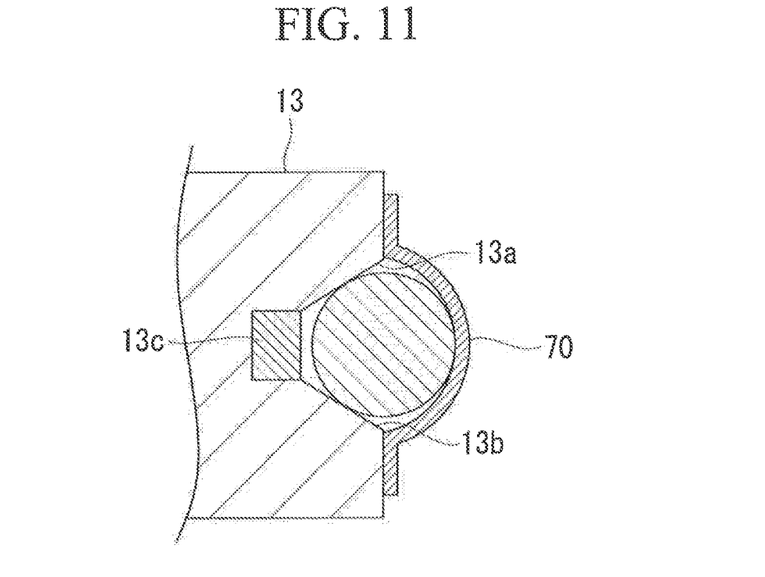
FIG. 11 is a schematic front view showing a second modified example of the work clamping device of the first embodiment.

Also, as shown in FIG. 11, instead of using the pre-clamping positioning member 20, it is possible to temporarily hold the work 1 to the receiving member 10 by fitting a ring-shaped pre-clamping positioning member 60 which is made of ferromagnetic materials to the outer circumference surface of the columnar portion 2 of the work 1 so as to use the attraction force of the attraction member 13c which attracts the pre-clamping positioning member 60. In this case, a cavity portion 13d is formed at a position which corresponds to the pre-clamping positioning member 60 on the V-shaped receiver.

Further, as shown in FIG. 11, instead of using the pre-clamping positioning member 20, it is possible to temporarily hold the work 1 to the receiver 10 by abutting a pre-clamping positioning member 70 which is made of a ferromagnetic material against the side of the clamp mechanism 30 of the outer circumference surface of the columnar portion 2 of the work 1 so as to use the attraction force of the attraction member 13c which attracts the pre-clamping positioning member 70.

In addition, this embodiment shows the attraction member 13c which is a magnet, and the pre-clamping positioning members 20, 60, 70 which are made of a ferromagnetic material. However, the pre-clamping positioning members 20, 60, 70 can be a magnet, and the attraction member 13c can be made of a ferromagnetic material, or the attraction member 13c can also be a magnet capable of attracting the pre-clamping positioning members 20, 60, 70 which are made of a magnet.

Figure 12:
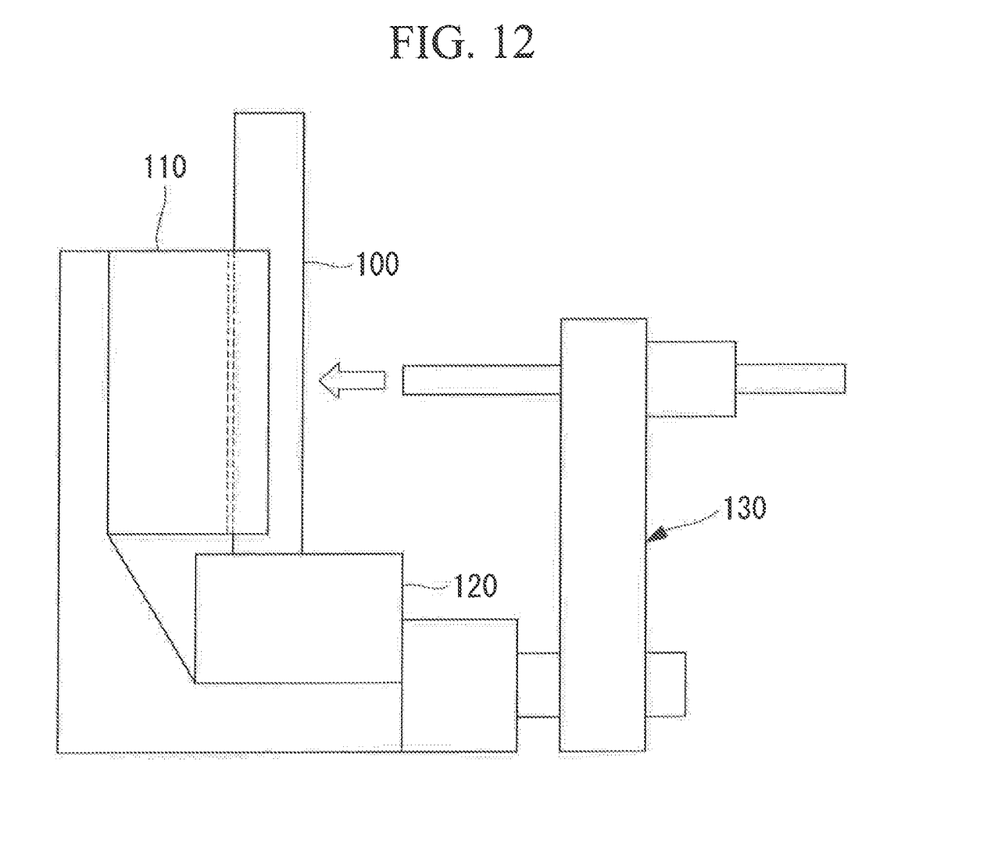
FIG. 12 is a view showing a movement of the work when placing the work on a work clamping device without holding the work temporarily.

In various work clamping devices, due to its shapes or materials, further, due to its clamping posture, the work may be lifted from the receiving member when the work is placed on the work clamping device. For example, it may happen that a cylindrical-shaped work 100 tilts as shown in FIG. 13 when pressing the work 100 to a V-shaped receiver 110 by a clamp mechanism 130 in a state where an outer circumference surface of the cylindrical-shaped work 100 has contact with the V-shaped receiver 110 having a V-shaped groove extending in an up-and-down direction, and where the lower end of the work 100 is supported by a seat portion 120, as shown in FIG. 12.

Figure 13:
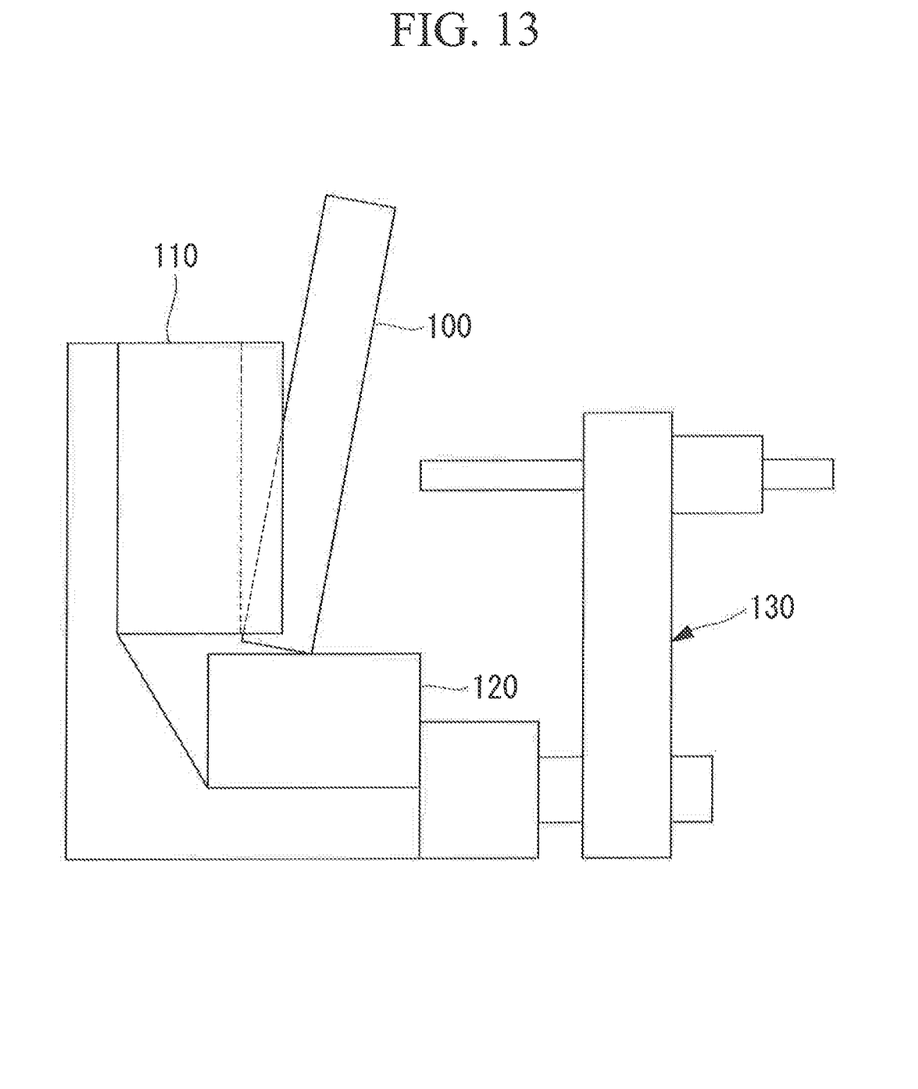
FIG. 13 is a view showing a movement of the work when placing the work on the work clamping device without holding the work temporarily.
Figure 14:
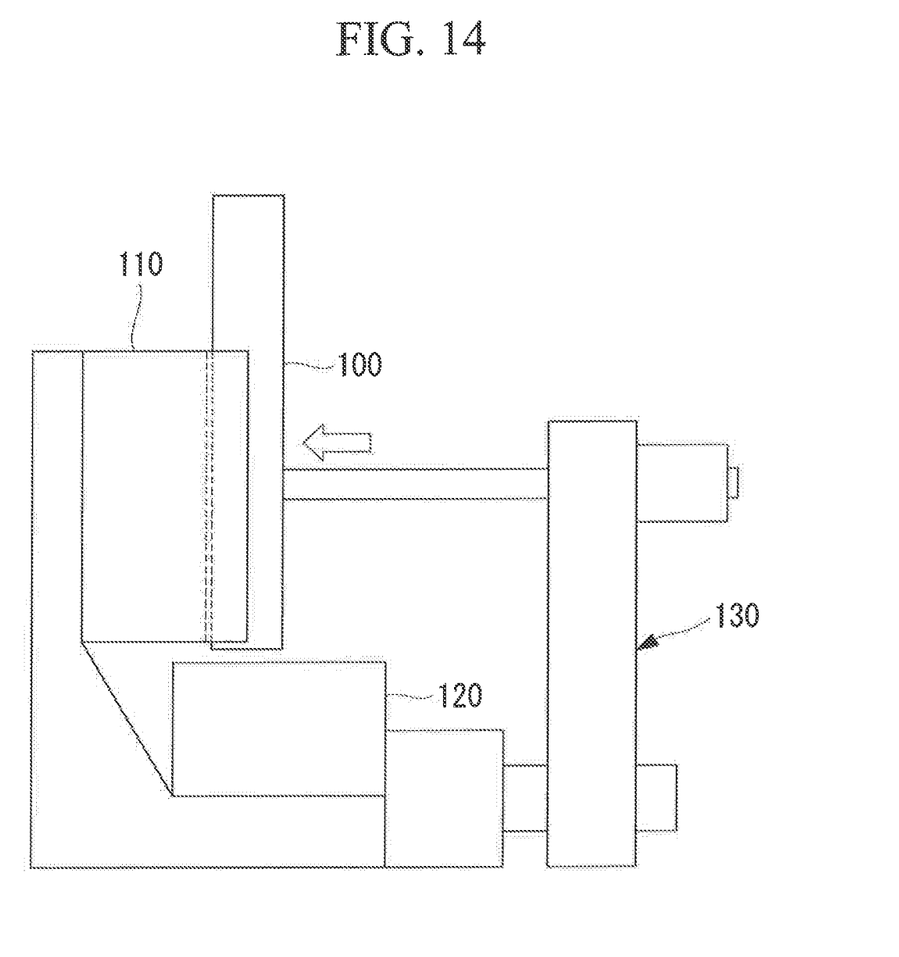
FIG. 14 is a view showing a movement of the work when placing the work on the work clamping device without holding the work temporarily.

In a state in which the work 100 is tilted as shown in FIG. 13, when the work 100 is pressed to the V-shaped receiver 110 by the clamp mechanism 130, a gap will be formed between the lower end of the work 100 and the seat portion 120 as shown in FIG. 14. Thereby, this varies the clamping position of the work 100, which is not preferable for improving processing accuracy of the work 100.

Here, when the work 100 is made of magnet-attractable materials, it is possible to prevent the work 100 from inclining by providing a magnet to the V-shaped receiver 110 or the seat portion 120, however, this solution does not work for a work 100 which is not made of magnet-attractable materials.

The inventor has arrived at the following aspects of the present invention, considering the aforementioned circumstances.

A work clamping device according to a first embodiment including a receiving member which has a first contacting surface which comes into contact with a first circumference position of an outer circumference surface of a columnar portion of a work, and a second contacting surface which comes into contact with a second circumference position of the outer circumference surface of the columnar portion; an attraction member which is provided in the receiving member and which is made of a ferromagnetic material or a magnet; a pre-clamping positioning member which is to be attached to the columnar portion and which temporarily hold the columnar portion to the receiving member by being attracted to the attraction member by magnetic force; and a clamp mechanism which presses the columnar portion temporarily positioned by the pre-clamping positioning member toward the first and the second contacting surfaces of the receiving member.

With this aspect, the pre-clamping positioning member is attached to the columnar portion of the work, and the work is temporarily held to the receiving member by the pre-clamping positioning member which is attracted by the attraction member provided in the receiving member. Therefore, even when the work is made of materials which are not attracted to a magnet, the work can stably be clamped regardless of its clamping posture.

In the above aspect, it may be possible that the columnar portion has a hollow portion, and the pre-clamping positioning member is attached to the columnar portion by inserting the pre-clamping positioning member into the hollow portion.

With this configuration, since the pre-clamping positioning member is not exposed outside the work when positioning the work temporarily and when pressing the work to the receiving member by the clamp mechanism, flexibility in deciding press positions of the clamp mechanism and processing positions of the work will be large.

Also, with the above aspect, the attraction member may be an electromagnet.

In such case, attraction force which attracts the pre-clamping positioning member can be adjusted in accordance with strength of the work, distance between the pre-clamping positioning member which is attached to the work and the attraction member, and the like. By this, it is possible to prevent the work from being deformed or being damaged when the strength of the work is low, and when it is necessary to slightly adjust a position of the work on the receiving member, it is possible to perform such adjusting work easily.

According to the aforementioned aspects, it is possible to clamp a work stably regardless of its clamping posture even when the work is made of materials which are not attracted to a magnet.

REFERENCE SIGNS LIST 1 work
2 columnar portion
3 head portion
10 receiving member
11 base member
12 seat portion
13 V-shaped receiver
20 pre-clamping positioning member
30 clamp mechanism
31 clamp mechanism main body
32 air cylinder
32*a* rod

The invention claimed is:

1. A work clamping system comprising:
   a receiving member which has a first contacting surface which comes into contact with a first circumference position of an outer circumference surface of a columnar portion of a work which has the columnar portion and a head portion provided at one end of the columnar portion in an axial direction of the columnar portion, and a second contacting surface which comes into contact with a second circumference position of the outer circumference surface of the columnar portion; and
   a clamp mechanism which presses the columnar portion on the first contacting surface and the second contacting surface,
   wherein a center of gravity of the work is located at a side of the head portion,
   wherein the work clamping device further comprises:
   an attraction member which is provided in the receiving member and which comprises a ferromagnetic material or a magnet; and
   a pre-clamping positioning member which is not a liquid state but a solid state and which is to be inserted into a hollow portion in the columnar portion, the hollow portion extending in the axial direction of the columnar member, and which temporarily hold the columnar portion to the receiving member by being attracted to the attraction member by magnetic force,
   wherein the clamp mechanism presses the columnar portion temporarily positioned by the pre-clamping positioning member on the first and the second contacting surfaces of the receiving member.

2. A work clamping system comprising:
   a receiving member which has a V-shaped receiver which comes into contact with an outer circumference surface of a columnar portion of a work which has the columnar portion and a head portion provided at one end of the columnar portion in an axial direction of the columnar portion; and
   a clamp mechanism which presses the columnar portion on the V-shaped receiver,
   wherein a center of gravity of the work is located at a side of the head portion,
   wherein the work clamping device further comprises:
   an attraction member which is provided in the receiving member and which comprises a ferromagnetic material or a magnet; and
   a pre-clamping positioning member which is not a liquid state but a solid state and which is to be fitted on an outer circumference surface of the columnar portion,
   wherein a cavity portion is formed in the V-shaped receiver at a position corresponding to the pre-clamping positioning member,
   wherein the clamp mechanism presses the columnar portion temporarily positioned by the pre-clamping positioning member on the V-shaped receiver of the receiving member.

3. The work clamping device according to claim 1, wherein the attraction member further comprises an electromagnet.

* * * * *